Nov. 22, 1966 R. F. MALLINA 3,286,458
MINIATURE STAPLE MANUFACTURE AND LOADING
Filed Aug. 21, 1963 2 Sheets-Sheet 1

INVENTOR:
RUDOLPH F. MALLINA,
BY
HIS ATTORNEY.

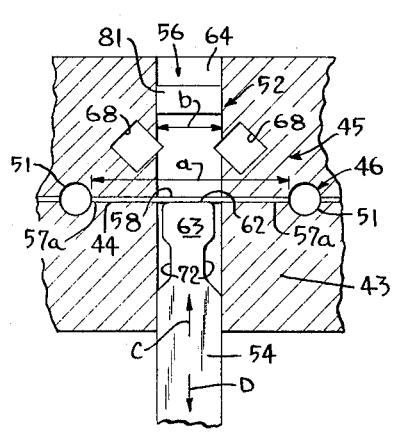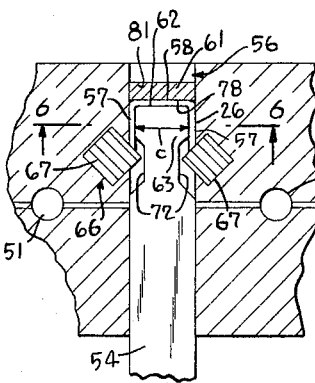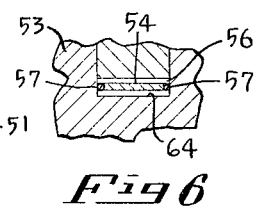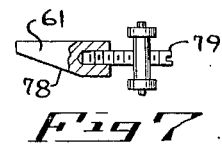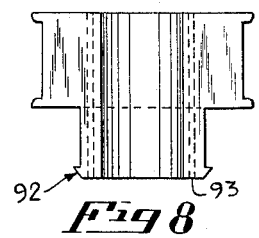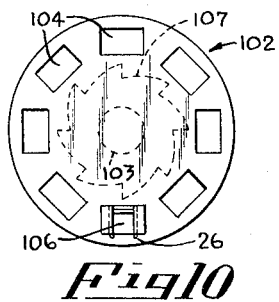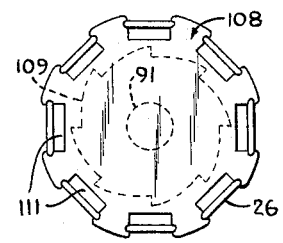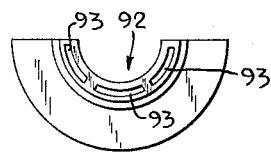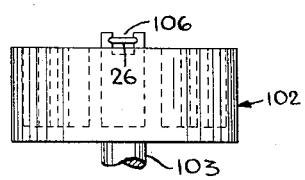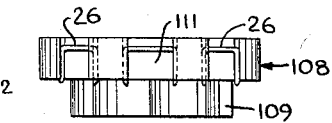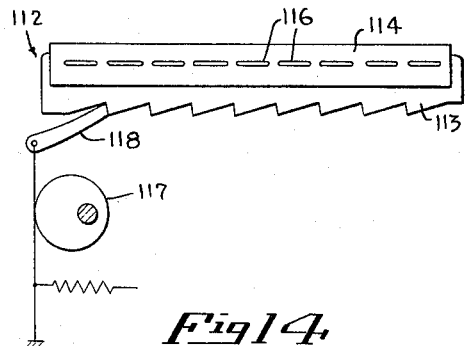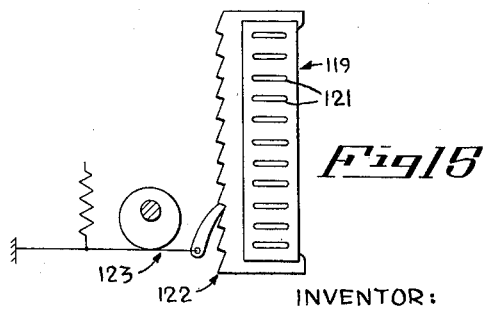
INVENTOR:
RUDOLPH F. MALLINA
BY
HIS ATTORNEY 
United States Patent Office 3,286,458
Patented Nov. 22, 1966

3,286,458
MINIATURE STAPLE MANUFACTURE
AND LOADING
Rudolph F. Mallina, Hastings on Hudson, N.Y., assignor to Foundation for Medical Technology, New York, N.Y., a corporation of New York
Filed Aug. 21, 1963, Ser. No. 303,499
18 Claims. (Cl. 59—74)

The invention relates to stapling, and relates more particularly to the manufacture of miniature staples and the loading thereof into carriers for subsequent use in staplers.

The invention will be described in the following in connection with miniature suturing staples, which are used in medical staplers by surgeons, but it will be understood that this is done merely to facilitate the explanation of the invention, and that no limitation is thereby intended except as pointed out in the claims hereof.

Reference is had to the following articles and patent applications:

"Surgical Stapling" Scientific American 207:48 (October 1962) by Rudolph F. Mallina et al.;

"Tape, Glue and Staples" Hospital Focus (April, 1963);

Patent application of Rudolph F. Mallina et al., Ser. No. 154,187, filed November 22, 1961, now Patent No. 3,144,654;

Patent application of Rudolph F. Mallina, Ser. No. 224,816, filed September 19, 1962, now Patent No. 3,176,896;

Patent application of Rudolph F. Mallina, Ser. No. 292,498, filed July 2, 1963, now Patent No. 3,225,996.

Staples for office staplers are known; they are usually cemented together in stick form, each stick being used to load a stapler.

The very small size of the medical suturing staples, however, raises problems, that demand solutions, which are entirely unknown in the manufacture and loading of office staples. As explained in the foregoing articles and patent applications, some of the miniature suturing staples are so small that they can hardly be seen with the unaided eye. Likewise, the apertures of the staple receptacles are so small, that manual loading of the minute staples into these small apertures demands a great deal of dexterity. It should be borne in mind that until now these surgical staplers have been loaded by hand; loading by hand has the further disadvantage that the surgeon can never be really certain that the staple is so emplaced that it will positively be transferred from the receptacle into the tissue, during surgical stapling.

The manufacture of these small staples, which are made of stainless steel or tantalum wire or vitalium wire, also has presented problems; many have heretofore been made either by hand or by primitive tools, requiring great skill and yet resulting in great waste.

It is accordingly among the principal objects of the invention to manufacture by machine miniature staples, in cyclical continual production.

It is another object of the invention to load staples of this type into staple carriers.

It is a further object of the invention to manufacture such staples and to load each immediately thereafter onto a carrier.

It is still another object of the invention to load a series of such staples into a multiple staple carrier, by moving the staples, as well as the carrier, for properly depositing each staple into one of the staple receiving apertures of the carrier.

With the above and other objects of the invention in view, the invention consists in the novel methods, construction, arrangement and combination of various devices, elements and parts, as set forth in the claims hereof, certain embodiments of the same being illustrated in the accompanying drawings and described in the specification.

The foregoing and other objects of the invention will be best understood from the following description of exemplifications thereof, reference being had to the accompanying drawings, wherein:

FIG. 4 is a large scale fragmentary sectional view of a detail of the machine illustrating the severing of a piece of wire;

FIG. 5 is a fragmentary sectional view of another detail of the machine illustrating the U-forming and trimming of the wire pieces;

FIG. 6 is a fragmentary sectional view taken on the line 6—6 of FIG. 5;

FIG. 7 is a fragmentary elevational view, partly in section, of a detail illustrating the stroke limiting anvil;

FIG. 8 is a large scale plan view of a staple carrier of the half-bushing type disclosed in the aforesaid application Ser. No. 154,187;

FIG. 9 is a front elevational view thereof;

FIG. 10 is a plan view of a modified carrier for a group of single staple cartridges of the type disclosed in the aforesaid application Ser. No. 292,498;

FIG. 11 is a front elevational view thereof;

FIG. 12 is a plan view of a still further modified carrier, namely a multiple staple cartridge of the type disclosed in the aforesaid application Ser. No. 292,498;

FIG. 13 is a front elevational view thereof;

FIG. 14 is a fragmentary schematic plan view of a series type staple cartridge of elongated shape, and a stepping mechanism therefor; and FIG. 15 is a fragmentary schematic plan view of a parallel type staple cartridge of elongated shape, and its stepping mechanism.

Figure 1:
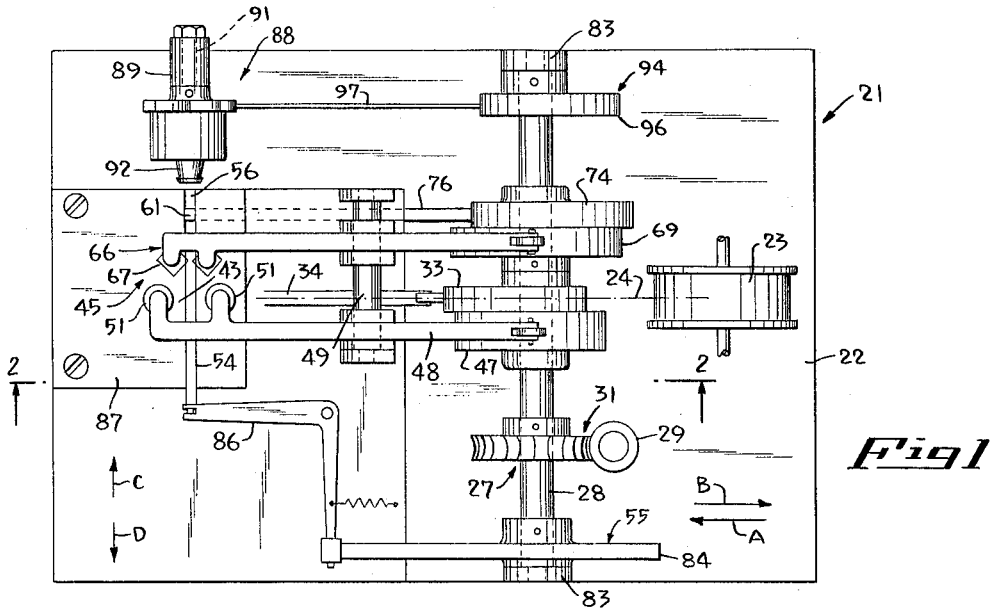
FIG. 1 is a schematic plan view, partly in section, of a staple manufacturing and loading machine in accordance with the invention.
Figure 2:
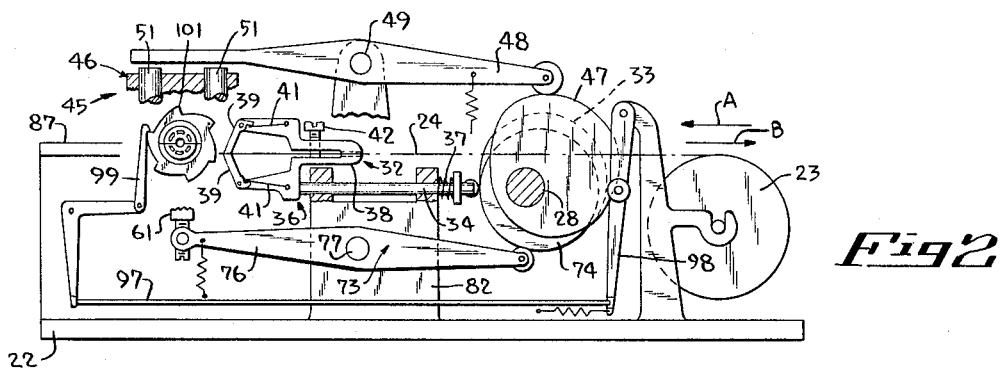
FIG. 2 is a fragmentary sectional view taken on the line 2—2 of FIG. 1.

In carrying the invention into effect in the embodiments which have been selected for illustration in the accompanying drawings and for description in this specification, and referring now particularly to FIGS. 1 and 2, there is provided a staple manufacturing and loading machine generally indicated at 21. The machine 21 includes a frame or frame structure designated 22.

Wire feeding

A spool 23 is suspended by the frame 22 for paying out wire 24 from which the staples 26 (FIG. 5) will be formed.

The wire 24 may be stainless steel, tantalum or vitalium, and may have a thickness of from about .004 in. to about .016 in. It may, however, consist of different medically inert metal, or of a non-metallic medically inert substance such, for instance, a suitable plastic or other filament capable of forming staples and of being sterilized; it is therefore understood that the term "wire" as used herein is not intended to be restricted to metallic wire.

The wire 24 is fed in one direction, namely the direction A, from right to left in FIGS. 1, 2.

A control mechanism, generally indicated at 27, is provided for controlling the feeding of the wire 24 and for the subsequent shaping, trimming and loading thereof. The control mechanism 27 includes a cam shaft 28 that may either be driven by hand, or may be driven by a motor 29 and suitable transmission gearing 31 such as a worm and worm wheel. The control mechanism 27 furthermore includes a series of cams in driven connection with the cam shaft 28; for instance the various cams may be keyed on the shaft 28, as shown in FIG. 1. The control mechanism 27 also includes associated cam followers. The cams and cam followers will be described in detail as this specification proceeds.

Wire feeding means, generally indicated at 32, are provided for feeding the wire 24 unidirectionally in the direction A (from right to left, FIGS. 1, 2). The feeding means 32 comprise a cam 33, a pusher rod 34 that acts as a follower for the cam 33, and a toggle jaw 36. A retraction spring 37 may be provided that urges the rod 34 normally in the opposite direction B (from left to right, FIGS. 1, 2) for retaining the cam follower in active engagement with the cam 33.

The toggle jaw 36 comprises a C-shaped body 38. Two toggles 39 are pivoted near the ends to the body 38. Each toggle 39 has a spring 41 which biases its toggle, so that the free ends of the toggles 39 will pinch or grip the wire 24 sufficiently during movement in the feed direction A to accomplish a positive feed action. The body 38 may be connected to the rod 34 for moving therewith in the opposite directions A and B.

During the return stroke of the rod 34 and the toggle jaw 36, in the direction B, no pinching takes place, the wire 24 remains stationary, and the toggles 39 slide on the wire. Conventional means may be provided (not shown) for holding the wire 24 stationary during the return stroke of the rod 34. Adjustment means may be provided, such as a screw 42, to adjust the pinching force; turning of the screw will change the toggle angle and thereby increase or decrease the grip exerted by the toggles 39 on the wire 24.

Wire cutting

After the wire 24 has been moved in the direction A for a sufficient length to a cutting station 43, a piece 44 of predetermined length will be severed from the wire 24 in said cutting station 43. Cutting means 45 are provided on the machine 21, which include severing means 46 for severing the piece 44 off the wire 24 in the station 43. The severing means 46 comprise a cam 47 and a cam follower. The cam follower may be a two-armed lever 48 that is pivoted about a stationary pivot shaft 49. The severing means 46 furthermore comprise two punches 51 which are actuable by the free arm of the lever 48. The minimum distance $a$ between the punches 51 corresponds to the aforesaid predetermined length of the wire space 44. This length $a$ is larger than the developed U-shape of the finished staple 26 because, as explained later on, the ends of the staple 26 are subsequently subjected to trimming for length control and pointing.

In the station 43, the wire wastes from the punching by the punches 51 will fall down by gravity. The wire wastes are short wire particles that are hair-thin and that have a tendency, like dust, to adhere to surfaces. A vacuum pump (not shown) may therefore be connected in a suction line to the lower section of the machine 21 and communicate with the severing means 46.

U-shaping the wire

The wire piece 44 is next formed into U-shape. This is done in a die, that is generally indicated at 52, which comprises a stationary die part 53 and a movable die part or pusher 54. Driving means 55 are provided for actuating the pusher 54.

The stationary die part 53 defines a thin, wide guide channel 56; its width $b$ corresponds to the overall length of the finished staple 26, and its thickness is only slightly in excess of the thickness of the wire 24. The pusher 54 is formed as a thin blade preferably of tool steel or similar suitable material that has a thickness corresponding to that of the wire 24 and a width $c$ that corresponds to the inner distance between the legs 57 of the staple 26. The legs 57 extend from the central portion or web or base 58 of the staple 26.

The guide channel 56 is disposed at right angle to the feed direction A of the wire 24; thus, the pusher 54, moving in its path in the guide channel 56, will push in the direction C (upwardly, FIG. 1) and, respectively, be retracted in the opposite direction D (downwardly, FIG. 1) at right angle to the wire feed direction A.

As best shown in FIG. 4, during the forming stroke in the direction C of the pusher 54, the leading face 62 of the head 63 of the pusher 54 will engage the central portion 58 of the wire piece 44. The punches 51 are arranged symmetrically about the guide channel 56 so that after severing of the piece 44 from the wire 24 its central portion 58 will lie across the guide channel 56.

During the forming stroke in the direction C, the central portion 58 of the wire piece 44 will continue to extend parallel of its original position, but will be moved in a forming path at right angle thereto, namely in the direction C. The side portions 57a of the piece 44 will be bent rearwardly during the forming stroke, at right angle to the central portion 58, and will be supported by the lower surface 64 of the guide channel 56. Thus there is formed the piece 44 in U-shape, with the side portions 57a trailing the central portion 58 throughout the movement through the guide channel 56.

Staple trimming

An abutment piece, such as an anvil 61, is movable to and from a blocking position within the guide channel 56; in this blocking position, the central portion 58 will abut against the anvil 61 and will thereby be interrupted in its course in the direction C.

This abutment is so arranged that in the abutting position the side portions 57a can be trimmed to cut the free end of each leg 57 to a predetermined length and pointed to a predetermined angle. The predetermined angle may for instance be from 30° to 45° relative to the direction C.

The cutting means 45 of the machine 21 include shearing means 66 for cutting the staple points at said angle. The shearing means 66 comprise a shearing mechanism which includes two shearing heads or punches 67 that may be of square cross section. Shearing edges 68 are formed in the lower surface 64 of the channel guide 56. The shearing means 66 further comprise a cam 69 that is keyed on the shaft 28, and a cam follower in the form of a two-armed lever 71 that is pivoted on the shaft 49. The shearing heads 67 are actuatable by the free arm of the lever 71. The clippings may be sucked in the aforementioned vacuum line. The pusher 54 may have clearance cut-outs 72 to make way for the shearing heads 67.

If desired, the aforesaid severing of the wire and the angular trimming of the wire ends may be made with a single set of punches, instead of the two instant sets 51 and 67, and may even be made in a single operation before U-shaping.

Lifting means 73 are provided for raising and lowering the anvil 61 in timed relationship with the forming stroke movement of the pusher 54. The lifting means 73 include a cam 74 that is keyed on the shaft 28 and a cam follower, namely a two-armed lever 76 that is pivoted about a stationary fulcrum 77.

The anvil 61 is furthermore adjustable so as to provide for different lengths of the staple legs 57. For this purpose the anvil may have a tapered or sloped face 78, and carry a screw 79 with which it is threaded into the free end of the lever 76. By turning the screw 79, the impact position of the tapered face 78 with the central portion 58 is altered, and places the central portion 58 into a position which corresponds to the desired changed length of the legs 57.

Subsequent to the shearing of the leg ends, the anvil 61 will be withdrawn from its position in the guide channel 56 where it had blocked the path for the staple 26. The guide channel 56 is cut out at 81 to provide a passage for the anvil 61.

The withdrawal of the anvil 61 clears the path for the continued movement in the direction C of the now completed staple 26, for transferring the staple 26 to a carrier for loading the carrier.

A support 82 is formed on the frame 22 and supports the stationary fulcrum 77, and slidably the rod 34, and supports non-rotatably the pivot shaft 49. Supports 83 are furthermore formed on the frame 22 supporting the cam shaft 28.

Each of the cam followers will be spring biased with retraction springs in a conventional well known manner, but for the sake of clarity of presentation these springs have been omitted except for the previously discussed spring 37 for the rod 34.

Similarly, retraction springs (not shown) may be provided for the punches 51 and for the shearing heads 67, raising these parts when the respective actuating arm of the cam follower is lifted.

The driving means 55 include a cam 84 that is keyed to the shaft 28, a bell crank lever 86 and the aforesaid pusher 54. The cam 84 is so arranged that it will first move the pusher 54 in the direction C until there has been abutment with the anvil 61 and, upon withdrawal of the anvil 61, continue to move the pusher 54 in the direction C.

*Machine adaptable for various size miniature staples*

The machine 21 may be adapted for the forming, shearing and loading of a variety of staples. For instance, the staples, as pointed out in the foregoing, may have a wire thickness of from about .004 in. to about .016 in.; the staple width $b$ may be from about .050 in. to about .160 in.; and the length of the staple legs 57 may be from about .050 in. to about .140 in.

There is provided an adapter plate 87 which carries for each staple size a die 52 including a pusher 54, shearing heads 67 and punches 51. Furthermore for a different staple size there needs to be exchanged or modified the pusher cam 84, and the anvil 61 must be adjusted with the aid of the screw 79 as previously described.

*Staple loading*

Loading means are provided for loading the staples 26 into a carrier. The loading means comprise the pusher 54, holding means for the carrier, and stepping means to shift the holding means so that at each cycle a different staple may be transferred to a carrier.

In the embodiment of FIGS. 1 and 2, the holding means have been designated 88, and include a holder or nest 89 that is rotatably mounted on a horizontal stationary shaft 91 that is supported on the frame 22.

An alternative way of rotating the bushing through certain angles is by placing it in a square or hexagonal or octagonal holder and turning the holder on a suitable base.

The holder 89 is adapted to hold two bushing-halves 92 of the type shown in FIGS. 8 and 9. When the two bushing-halves 92 are held together, they will have six apertures or ports 93 for receiving staples 26, each port 93 being angularly offset from the next port 93 by 60°; the bushing-halves 92 may, however, also have a different amount of ports, for instance four ports offset from each other by 90°, or eight ports offset by 45°, per bushing.

Stepping or indexing means generally indicated at 94 are provided for stepping the holder 89 to the next port 93 after the preceding port 93 has been loaded with the staple 26. The stepping means include a stepping cam 96 and cam follower means 97 which include a link train comprising as the first link a one-arm lever 98 and as the last link a pawl 99. The holder or nest 89 may include ratchet teeth 101 corresponding in number to the ports and which co-act with the pawl 99; in the instant case of six ports 93, there are provided six ratchet teeth 101. The holder 89 is so mounted on the shaft 91 that the circle along which the portholes 93 are formed will be in register with the guide channel 56.

In accordance with the modification of FIGS. 10 and 11, the holding means include a holder 102 and a vertical shaft 103. The holder 102 can turn about the shaft 103, and suspends a series, for instance eight, cartridges 104, each cartridge 104 being capable to be loaded with a single staple 26 in its staple receiving and retaining aperture 106. The holder 102 is so arranged that the circle of the apertures 106 will be in register with the guide channel 56.

The indexing or stepping is done in a similar manner as previously described, the holder 102 carrying a ratchet wheel 107.

In the embodiment of FIGS. 12 and 13 there is shown a multiple staple cartridge which constitutes the holder 108 of the holding means. It is turnable about the horizontal shaft 91. The holding means may include a ratchet wheel similar to the wheel 107; as explained in the aforesaid application Ser. No. 292,498, however, the multiple staple cartridge usually will include as a part of its structure a ratchet wheel 109, and this ratchet wheel 109 may be used for imparting the stepping motion. The staples 26 are loaded one by one into each of the staple receiving and retaining apertures 111.

In the modification of FIG. 14, there is provided a holding means 112 that includes a toothed holder or nest 113 which holds a "series" type staple cartridge 114 with the apertures or ports 116 for the staple receptacles aligned on the cartridge in a single file arrangement. The stepping means includes a rotatable cam 117 that may be in driven connection from the cam shaft 28, and a pawl 118.

In FIG. 15 there is shown a further modification, namely the stepping arrangement for a staple cartridge 119 of the "parallel" type, wherein the apertures or ports 121 for the receptacles are arranged in parallel superposition on the cartridge. The holding means includes a toothed holder or nest 122, and the stepping means 123 provide for vertical propulsion of the nest 122.

In both the modifications of FIGS. 14 and 15, the respective cartridge 114, 119 is elongated and is moved longitudinally to position the respective apertures 116, 121 in succession in registry with the guide channel 56, by the respective stepping means.

*The operation*

The operation is as follows:

The motor 29 (or hand crank in a manual machine) will activate the transmission gearing 31, and by this means the cam shaft 28 will be rotated.

Figure 3:
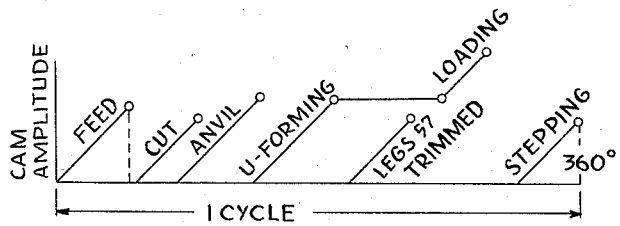
FIG. 3 is a schematic cycle diagram of the machine of FIGS. 1 and 2.

As best shown in the cycle diagram of FIG. 3, the machine completes an entire cycle at each full revolution of the cam shaft 28.

The wire feeding means will advance wire 24 from the spool 23, in the direction A, to the cutting station 43. At that cutting station, the severing means 46 will cut from the wire 24 a piece 44 of the predetermined length $a$.

Thereafter the pusher 54 will engage the central portion 58 of the piece 44 and push it into the guide channel 56 (FIG. 6) of the stationary die part 53. In the guide channel 56 the side portions 57a of the piece 44 will be bent backwardly, forming a U-shape, as the pusher 54 moves the piece 44 in the direction C at right angle to the preceding feeding direction A.

The anvil 61 enters through the aperture 81 to block temporarily the further movement in the direction C of the now U-shaped piece 44. During this blocking, the legs 57 are trimmed by the shearing means 66.

Thereafter, the anvil 61 is withdrawn from the guide channel 56, and the pusher 54 will resume the pushing of the staple 26 in the direction C, for transferring the staple 26 from the guide channel 56 into the respective aperture of the staple carrier for loading the carrier.

The holding means suspend the carrier in such a manner that a staple receiving aperture will be in register with the guide channel 56. This enables the pusher 54 to transfer a staple 26 from the guide channel 56 into said aperture.

The stepping means will then turn the carrier to place the next aperture in register with said channel 56.

This completes the cycle, in which a staple has been cut from fed wire, been shaped to U-form, been trimmed and loaded into the carrier, and the carrier been shifted.

In the succeeding cycles this will be repeated, until all the apertures of the carrier are loaded with staples. Thereafter, the operator will replace the full carrier with a new empty one.

As previously described, the machine 21 is adaptable for various staple sizes, and the machine can load "bushing" type cartridges, single staple or multiple staple cartridges, all for circular indexing; as well as "series" type and "parallel" type cartridges, for linear stepping or indexing.

After the cartridge has been loaded, it will be sterilized and in the sterilized condition be held in readiness for use by the surgeon in a medical stapler.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a method of forming successive miniature staples, the steps comprising cyclically feeding thin wire, thereafter cutting from said wire a piece of predetermined length, then forming said piece into U-shape having a central portion of predetermined length and two legs, and subsequently cutting the free ends of each leg at a predetermined angle to the leg thereby shortening and pointing said legs.

2. In a method, as claimed in claim 1, said predetermined length of wire piece being larger than the developed U-shape of the finished staple.

3. In a method as claimed in claim 1, said angle being from 30° to 45°.

4. In a method of forming a miniature staple, the steps comprising feeding thin wire in a first direction, thereafter cutting from said wire a piece of predetermined length, then moving the central portion of said piece in a second direction at an angle to said first direction and bending the end portions at right angle to the central portion, subsequently discontinuing the movement in said second direction and cutting the free ends of each leg at a predetermined angle to the leg thereby imparting sharp points to said legs to complete the staple, and thereafter resuming the movement in said second direction for transferring the completed staple.

5. In a method of forming and loading onto a carrier successive miniature staples, the steps comprising cyclically feeding thin wire in a first direction, thereafter cutting a piece of predetermined length off said wire, moving the central portion of said piece in a second direction at an angle to said first direction and forming said piece into U-shape having said central portion of predetermined length and two legs formed thereon, subsequently discontinuing the movement in said second direction and cutting the free ends of each leg at a predetermined angle to the leg thereby imparting sharp points to said legs to complete the staple, and thereafter moving again in said second direction the completed staple for transferring it to said staple carrier.

6. In a machine, for use in forming in cyclic operation successive miniature staples, the combination of a frame, feeding means supported on said frame and operable for cyclically feeding thin wire, cutting means including severing means operable for severing from said wire an elongated piece of predetermined length, a die supported on said frame including a stationary die part and a movable die part, the movable die part being operable to move in a path and to engage a portion of said elongated piece and first to push i tinto said stationary die part to be bent in said die into U-shape and later to push the U-shaped piece out of the die for expulsion of a completed staple from the machine, said cutting means including shearing means operable for trimming the free ends of the piece at a predetermined angle, driving means operative to move said movable die part in said path, and a control mechanism operative to control the movement of at least some of said means in timed cyclical relationship relative to each other.

7. In a machine, for use in forming in cyclic operation successive miniature staples, the combination of a frame, feeding means supported on said frame and operable for cyclically feeding thin wire to a station, severing means operable for severing from said wire in said station a straight piece of predetermined length, a die supported on said frame including a stationary die part and a movable die part, the movable die part being operable to engage a portion of said straight piece and to push it in a path first from said station into said stationary die part, whereby said piece will be bent in said die into U-shape having a central portion and two legs thereon, and to push the U-shaped piece subsequently for transfer out of the machine, abutment means movable to and from a blocking position in said path for temporarily blocking in said path the movement of said piece, cutting means operable for cutting the free ends of the U-shaped piece at a predetermined angle when said U-shaped piece abuts said abutment means in said path, driving means operative to move said movable die part in said path first towards said abutment means and, after removal of said abutment means off said path, to move again said movable die part for staple expulsion, and a control mechanism operative to control the movement of at least some of said means in timed cyclical relationship relative to each other.

8. In a machine, as claimed in claim 7, said control means including a cam shaft, a group of cams driven from said shaft, and a group of cam followers each engaging a cam and being assigned to one of said means.

9. In a machine, as claimed in claim 7, together with holding means connected to said frame and operable to suspend a staple carrier in registry with said path for transfer of the completed staple to said carrier.

10. In a machine, as claimed in claim 7, said die including a guide channel structure for guiding the staple legs in said path behind the central portion, said cutting means including a shearing mechanism, at least a portion of said guide channel structure forming part of said shearing mechanism.

11. In a machine, as claimed in claim 7, said severing means including two shearing heads movable to and from a shearing position in said station engaging in said station the wire for severing said piece therefrom, the distance between said shearing heads defining the length of said piece being larger than the developed U-shape of the finished staple.

12. In a machine, as claimed in claim 7, said feeding means including a toggle jaw comprising a C-shaped body movable in the feeding direction and opposite thereto and two movable toggles pivoted oppositely to said body and spring biased thereby to grip the wire when moving in the feeding direction for propelling the wire and, respectively, to release the wire when moving in the opposite direction.

13. In a machine, as claimed in claim 12, said body being adjustable, thereby to adjust the distance between the pivot points of the toggles, to adjust the gripping force when moved in the feeding direction.

14. In a machine, for use in forming and loading onto a carrier in cyclic operation successive miniature staples, the combination of a frame, feeding means supported on said frame and operable for cyclically feeding thin wire in a first direction to a station, severing means operable for severing from said wire in said station a piece of predetermined length, a die supported on said frame, a movable pusher operable to engage the central portion of said piece and moving it from said station into said die in a path in a second direction at an angle to said first direction, driving means operative to move said pusher in said second direction, whereby the end portions of said piece will be bent in said die at right angle to the central portion and will form legs thereon, an abutment movable to and from a position within said die in said path, to be abutted in that position by said central portion thereby limiting the movement of said piece in said second direction, cutting means operable for shearing simultaneously the free ends of both legs at a predetermined angle to shorten and point said legs thereby completing the staple, guide means operable for moving said abutment into said position prior to the operation of said cutting means and, respectively, for moving said abutment means from said position and out of said path after the operation of said cutting means has been completed, said driving means being operable to move said pusher in said second direction again after said abutment means has cleared said path, a holder mounted on said frame and operable to suspend at least one staple carrier in registry with said path, whereby said pusher will transfer a completed staple onto said carrier, stepping means connected to said holder and operative to move said holder cyclically for transferring succeeding staples, and a control mechanism operative to control the movement of all of said means in timed cyclical relationship relative to each other.

15. In a machine, for use in loading a carrier with miniature staples, the combination of a frame, loading means connected to said frame and operable for moving successive completed staples in a path, holding means operable for movably suspending an apertured carrier in such a manner relative to said frame that an aperture of said carrier may be moved into a position of registry with said path and to receive a staple, and stepping means operative to move said carrier for registering with said path succeeding apertures for transferring a staple into each aperture.

16. In a machine, as claimed in claim 15, said carrier being suspended revolubly about its center, said stepping means turning said carrier for a fraction of a full turn at each actuation.

17. In a machine, as claimed in claim 15, said carrier being elongated and having a group of parallel staple receiving apertures and being movable longitudinally for positioning said apertures in succession in register with said path, said stepping means being operable to move said carrier longitudinally past said path.

18. In a machine, as claimed in claim 15, said holding means being arranged to suspend a carrier in the form of a half-bushing for medical suturing staples having a group of peripherally arranged staple receiving apertures, said stepping means being operable to turn said half-bushing about its center to position each aperture thereof in succession in registry with said path.

References Cited by the Examiner
UNITED STATES PATENTS

| | | | |
|---|---|---|---|
| 362,530 | 5/1887 | Parmelee | 59—74 |
| 553,908 | 2/1896 | Griswold | 59—75 |
| 755,755 | 3/1904 | Edge | 59—74 |
| 3,144,654 | 8/1964 | Mallina | 227—19 |
| 3,193,981 | 7/1965 | Whitecar | 53—252 |

CHARLES W. LANHAM, *Primary Examiner.*

G. P. CROSBY, *Assistant Examiner.*